United States Patent [19]

Taft

[11] Patent Number: 4,463,562

[45] Date of Patent: Aug. 7, 1984

[54] BOOSTER ASSISTED HYDRAULIC MASTER CYLINDERS FOR VEHICLE BRAKING SYSTEMS

[75] Inventor: Phillip A. Taft, Solihull, England

[73] Assignee: Lucas Industries Public Limited Company, Birmingham, England

[21] Appl. No.: 371,986

[22] Filed: Apr. 26, 1982

[30] Foreign Application Priority Data

May 15, 1981 [GB] United Kingdom ............... 8114925

[51] Int. Cl.³ .............................................. B60T 7/06
[52] U.S. Cl. ....................................... 60/555; 60/581; 60/589; 60/556
[58] Field of Search ............... 60/547.1, 581, 589, 60/555, 556

[56] References Cited

U.S. PATENT DOCUMENTS 4,006,593 2/1977 Edwards ............................... 60/581
4,178,757 12/1979 Ketterling et al. ................... 60/581

FOREIGN PATENT DOCUMENTS 2084678 4/1982 United Kingdom .................. 60/581

Primary Examiner—Robert E. Garrett
Assistant Examiner—Randolph A. Smith
Attorney, Agent, or Firm—Scrivener, Clarke, Scrivener and Johnson

[57] ABSTRACT

In a master cylinder assembly the pressure spaces in advance of pedal-operated pistons of two separate master cylinders are interconnected by a transfer passage, and each master cylinder incorporates a boost chamber to which hydraulic fluid from a pressure source is admitted to act on the piston and augment the force applied to the piston by the pedal when the master cylinder is operated. Each master cylinder incorporates a control valve having a valve spool which is normally urged by a spring into a retracted position to close a transfer port providing communication between the pressure space and the transfer passage and to close an inlet port to cut-off communication between the pressure source and the boost chamber. The spool has a pressure-responsive face exposed to the pressure space and, when subjected to pressure in the pressure space in response to operation of the pedal, is operative to urge the spool against the loading of the spring and into an operative position in which the pressure space is placed in communication with the transfer port and the inlet port is placed in communication with the boost chamber.

6 Claims, 7 Drawing Figures

BOOSTER ASSISTED HYDRAULIC MASTER CYLINDERS FOR VEHICLE BRAKING SYSTEMS

SPECIFIC DESCRIPTION

This invention relates to master cylinder assemblies for vehicle hydraulic braking systems of the kind in which separate master cylinders are connected by a transfer passage through which pressure spaces in the cylinders in advance of pedal-operated pistons are in communication when the master cylinders are operated simultaneously to effect vehicle retardation, and communication between the pressure spaces is adapted to be cut-off by transfer valve means when one of the master cylinders is operated on its own to facilitate steering, each master cylinder incorporating a boost chamber to which hydraulic fluid from a pressure source is admitted to act on the piston and augment the force applied to the piston by the pedal when that master cylinder is operated.

In known master cylinder assemblies of the kind set forth the transfer valve means comprises a separate transfer valve in each master cylinder and each transfer valve is usually operated by the mechanical engagement with it of a part of the piston of that master cylinder, and a separate valve responsive to initial build up of pressure in a pressure space is operative to cause pressurisation of the boost chamber of that master cylinder.

According to our invention in a master cylinder assembly of the kind set forth each master cylinder incorporates a control valve having a valve spool which is normally urged by a spring into an retracted position to close a transfer port providing communication between the pressure space and the transfer passage and to close an inlet port to cut-off communication between the pressure source and the boost chamber, and the spool has a pressure-responsive face exposed to the pressure space and, when subjected to pressure in the pressure space in response to operation of the pedal, is operative to urge the spool against the loading of the spring and into an operative position in which the pressure space is placed in communication with the transfer port and the inlet port is placed in communication with the boost chamber.

In our invention therefore a single spool valve performs two functions and enables us to provide a simplified construction.

When both master cylinders are operated simultaneously both transfer ports are open to provide communication between the two pressure spaces to compensate for wear of the friction linings of the respective brakes on opposite sides of the vehicle which the master cylinders are adapted to operate, and both boost chambers are pressurised, conveniently from the same source.

When one master cylinder is operated on its own pressure fluid from the source is applied only to the boost chamber of that master cylinder, and no transfer of fluid between the two pressure spaces can take place since the spool of the valve of the other, non-actuated, master cylinder is in its retracted position.

When a boost chamber is pressurised that pressure acts on a second-pressure responsive face on the spool to react against the pressure from the pressure space and to augment the force in the spring. This tends to urge the spool towards the retracted position, and the spool is held in a balanced position to provide a compensating balanced flow through the transfer passage when both master cylinders are operated simultaneously.

By a careful selection in the relative areas of the piston of the master cylinder, the pressure-responsive faces on the spool, and a face on the piston of the master cylinder which is exposed to the pressure in the boost chamber we can arrange for the brake-applying force applied to the piston of the master cylinder to be augmented by a pressure in the boost chamber which is smaller than the pressure in the pressure space at any given time.

Some embodiments of our invention are illustrated in the accompanying drawings in which.

Figure 1:
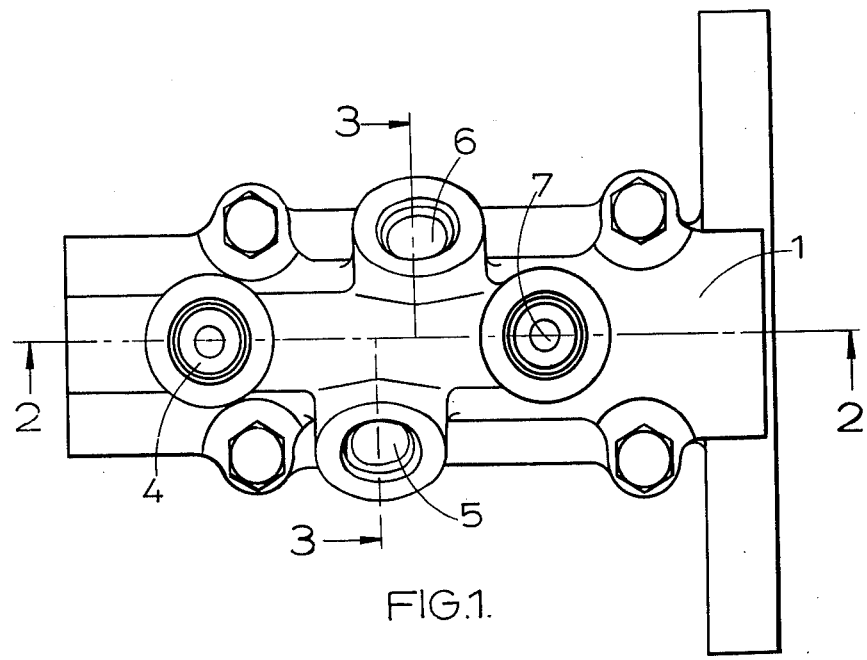
FIG. 1 is a plan of a master cylinder forming a part of a dual master cylinder assembly.
Figure 2:
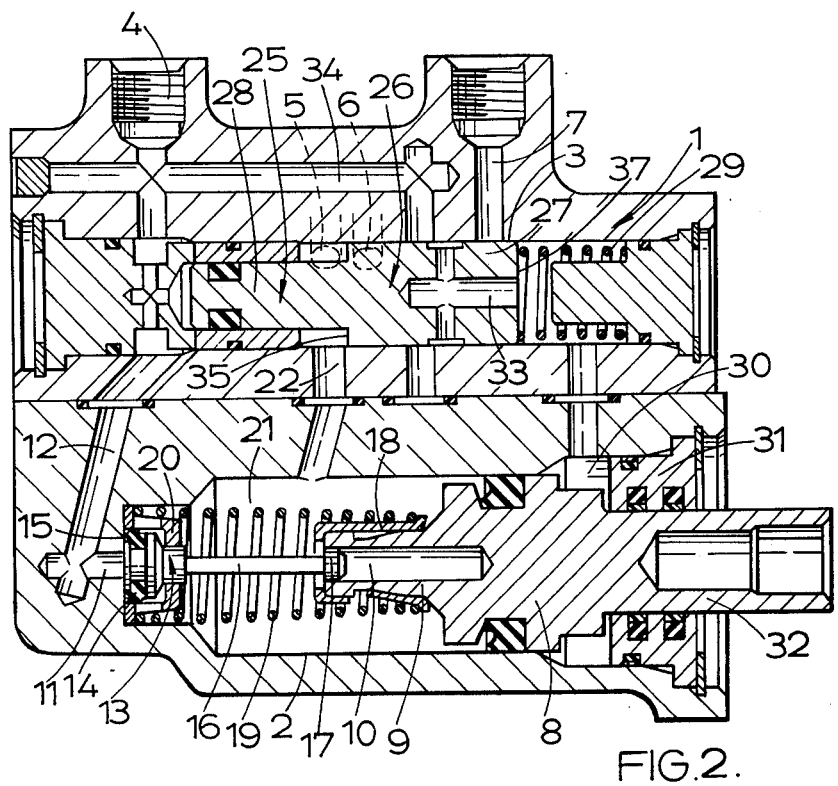
FIG. 2 is a section on the line 2—2 of FIG. 1.
Figure 3:
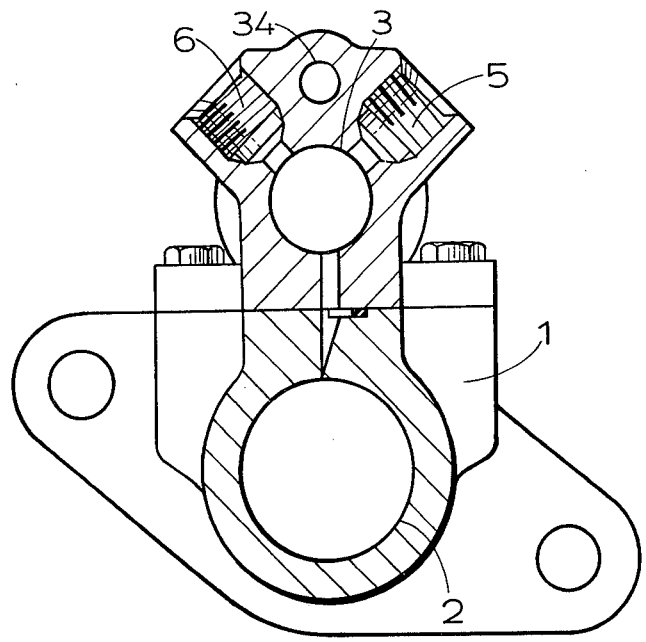
FIG. 3 is a section on the line 3—3 of FIG. 1.
Figure 7:
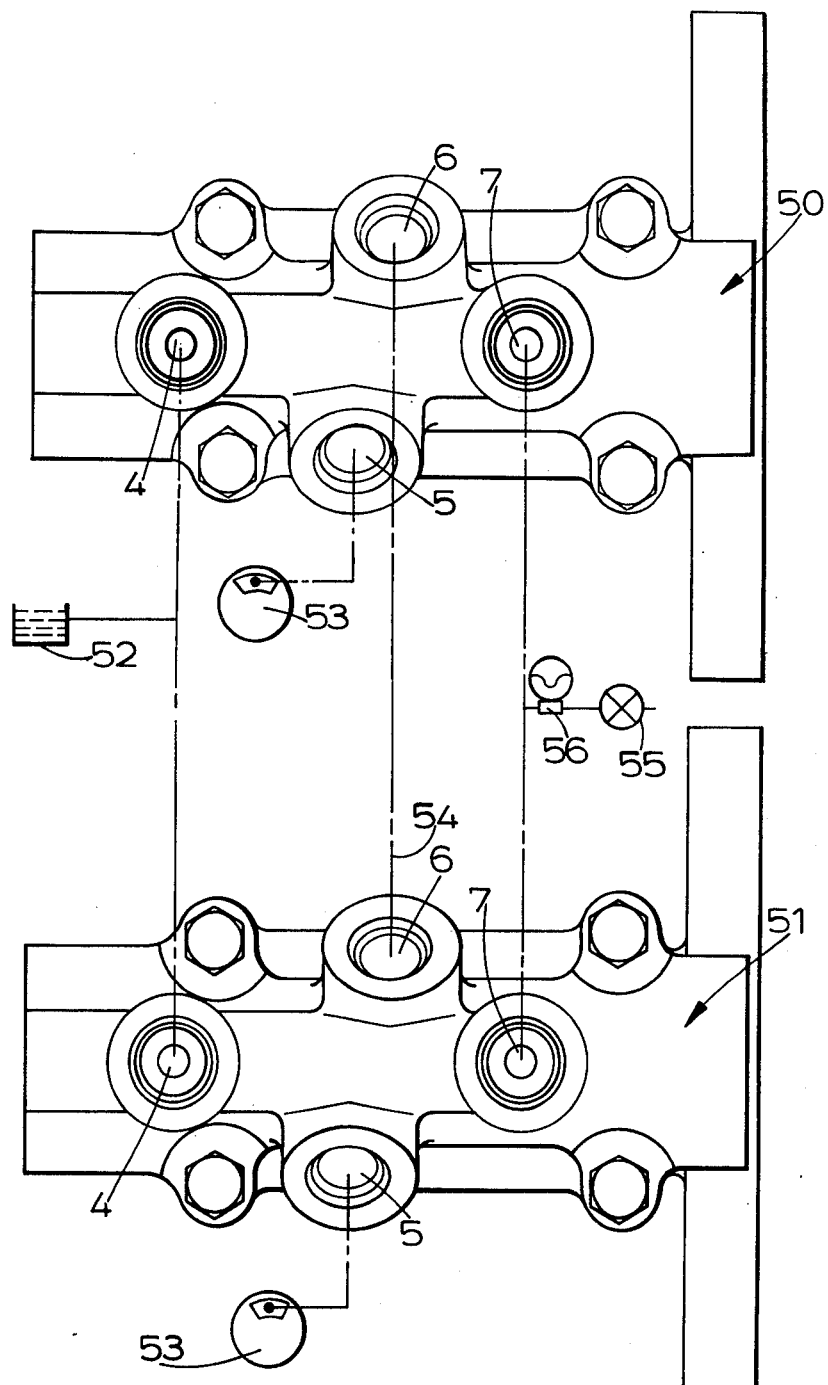
FIG. 7 is a plan of a dual master cylinder assembly comprising two pedal-operated master cylinders, each as illustrated in FIG. 1.

A booster-assisted hydraulic master cylinder assembly illustrated in FIG. 7 of the drawings comprises two pedal-operated master cylinders 50, 51, each as illustrated in FIGS. 1 to 3 of the drawings. Since the two master cylinders 50, 51 are identical in construction only one of the master cylinders need be described and the master cylinders can be installed in any convenient spaced locations in a vehicle.

Each master cylinder 50, 51 comprises a body 1 incorporating two spaced parallel longitudinally extending bores 2 and 3. The two bores 2 and 3 are interconnected at spaced locations as will be described. The body 1 is provided with a reservoir port 4 leading from a reservoir 52 for fluid and into the bore 2, an outlet port 5 leading from the bore 3 to a brake 53 on a wheel on one side of the vehicle, a transfer port 6 leading from the bore 3 and connected to a transfer passage, suitably a pipe-line 54, which is also connected to the transfer port of the other master cylinder 51, and an inlet port 7 also leading to the bore 3 from a source of high pressure fluid, suitably a pump 55 or an accumulator 56 charged by the pump, and which is also common to the other master cylinder 51.

A pedal-operated piston 8 working in the bore 2 is provided with a forward extension 9 in which is located an axial passage 10.

A recuperation port 11 at the forward end of the bore 2 is connected to the reservoir port 4 through communicating passages in the body 1 which traverse the bore 3 and are generally indicated by 12, and the recuperation port 11 is controlled by a recuperation valve 13.

The recuperation valve 13 comprises a head 14 for engagement with a seating 15 surrounding the port 11. The head 14 is carried by the forward end of an axially extending stem or rod 16 of which the opposite end carries an enlarged head 17 guided to slide in the axial passage 10 in the adjacent end of the extension 9. The head 17 is retained within the passage 10 by a thimble 18 which surrounds the extension 9. The thimble 18 forms an abutment for one end of a compression return spring 19 of which the opposite end acts on a case 20 in which the head 14 is housed. In the position shown in the drawings the spring 19 urges the piston 8 into a retracted position with the head 14 spaced from the seating 15 by the engagement of the thimble 18 with the head 17.

A pressure space 21 defined in the bore 2 in front of the piston 8 is connected to the outlet port 5 through a passage 22 in the body 1 which traverses the bore 3.

A combined boost-pressure control and transfer valve assembly 25 is housed in the bore 3. The valve assembly 25 comprises a spool 26 having a portion 27 of greater diameter working in the bore 3, and a portion 28 of smaller diameter working in bore portion 29 of reduced diameter and which is in communication with the passage 12. The spool 26 is normally held in a retracted position shown by a spring 29 which acts against the end of greater diameter. In this retracted position the portion 22 of the spool closes the transfer port 6 and the inlet port 7. Thus the pressure space 21 is isolated from the transfer connection, and the inlet port 7 is isolated from a boost chamber 30 which is defined in the bore 2 between the piston 8 and a closure 32 for the bore 2 and through which works a rod 32 upon which the pedal acts.

In the position shown the pressure space 21 is in communication with the reservoir 52 through the open recuperation valve 13, and the boost chamber 30 is also in communication with the reservoir 52, through the bore 3, and communicating passages 33 in the spool 26 and passages 34 in the body 1.

When the master cylinder is operated on its own initial movement of the piston 8 closes the recuperation valve 13 to isolate the pressure space 21 from the reservoir 52. Further movement of the piston 8 in the same direction pressurises fluid in the pressure space, which is applied to the brake through the outlet port 5 and also acts on the spool 26 over a first pressure-responsive face 35 comprising a shoulder of the step in diameter between the portions 27 and 28. This pressure urges the spool 26 towards the end of the bore 3 which is of greater area, against the load in the spring 29, to close the passage 34 from the boost chamber 30 and to open the ports 6 and 7. The transfer port 6 is therefore exposed to pressure in the pressure space and the boost chamber 30 is pressurised from the source 56.

Since the transfer port of the other master cylinder is closed, no transfer of fluid between the pressure spaces can take place.

Pressurisation of the boost chamber 30 applies pressure to the piston 8 to augment the brake-applying force applied to it by the pedal, and that pressure also acts on the spool 26 over a second pressure-responsive face 37 comprising the adjacent end of the spool 26, to apply a reaction to the spool 26 and augment the force in the spring 29. The spool 26 is therefore held in a balanced position.

When both master cylinders are operated simultaneously both spools 26 are held in balanced positions to provide a compensating balanced flow through the transfer passage 54 to compensate for differential wear of the friction linings.

The relative areas of the spool 26 and of the piston 8 and the boost chamber 30 are chosen so that the brake-applying force applied to the piston 8 by the pedal is augmented by the pressure in the boost chamber 30 even though that pressure may be smaller than the pressure in the pressure space 21 at any given time.

Figure 4:
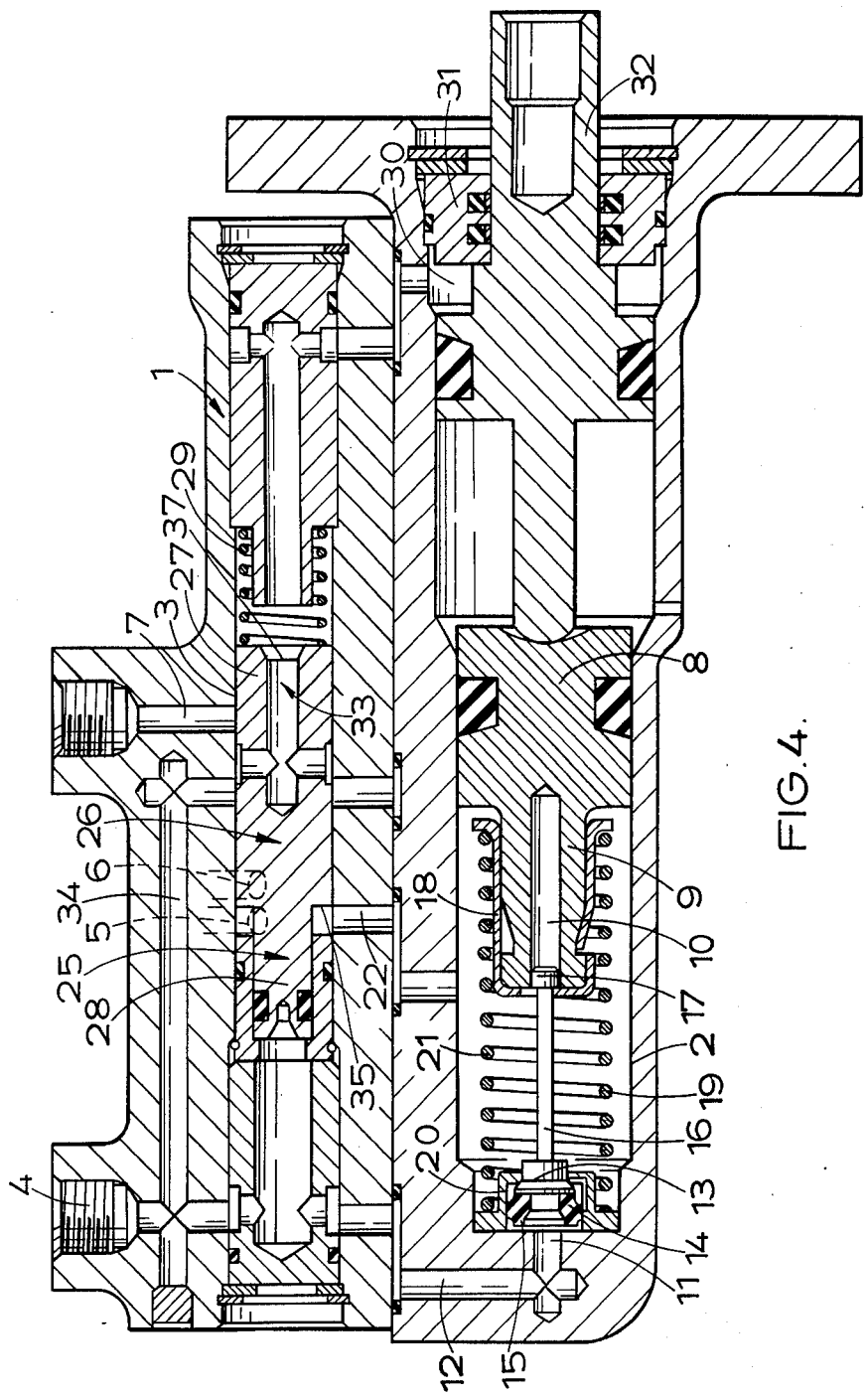
FIG. 4 is a section similar to FIG. 2 but showing a modification.

In the construction illustrated in FIG. 4 of the drawings the piston 8 comprises a two-part member of differential outline with the face exposed to pressure in the boost chamber 30 being of an area greater than that which is exposed to the pressure space 8. Thus the brake-applying force from the pedal can be augmented by a pressure in the boost chamber 30 which is substantially less than that in the pressure space 21.

The construction and operation of the master cylinder of FIG. 4 is otherwise the same as that of FIG. 2 and corresponding reference numerals have been applied to corresponding parts.

Figure 5:
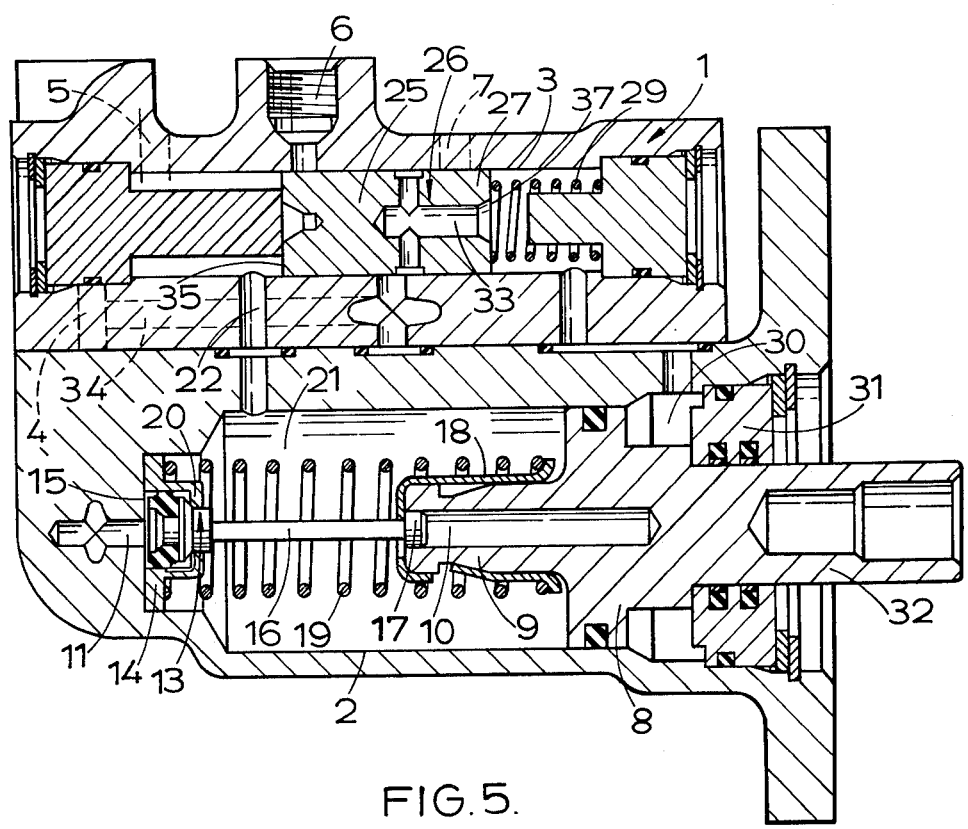
FIG. 5 is a section similar to FIG. 2 of another master cylinder.

In the master cylinder of FIG. 5 the spool 26 is of constant section throughout its axial length, otherwise the construction and operation is the same as FIG. 2 and corresponding reference numerals have been applied to corresponding parts.

Figure 6:
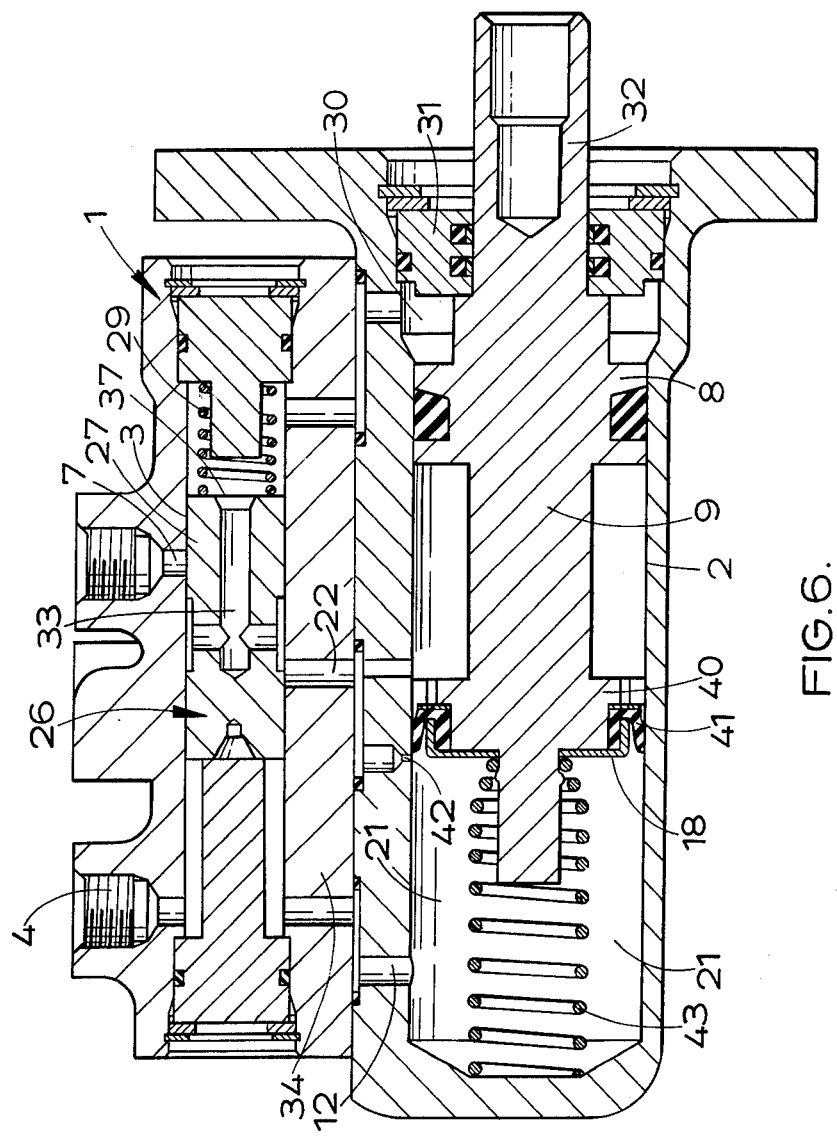
FIG. 6 is a section similar to FIG. 5 but showing a modification.

In the master cylinder of FIG. 6 the recuperation valve 13 comprises a head 40 at the forward end of the extension 9 of the piston 8, and the head 40 carries a seal 41 which is spaced to the rear of a recuperation port 42 in the body 1 when the piston 8 is in the retracted position shown and as dertermined by a return spring 43 which acts on the piston 8. The pressure space 21 is defined in the bore 2 in front of the head 40 and the seal 41.

When the pedal is operated the piston 8 is advanced in the bore 2, initially to close the recuperation port 42 thereby isolating the reservoir from the pressure space 21. Further movement of the piston 8 in the same direction pressurises the fluid in the pressure space 21 and, thereafter, the operation is the same as that described above with particular reference to FIG. 5.

I claim:

1. A master cylinder assembly for a vehicle hydraulic braking system comprising a first master cylinder, and a second master cylinder, each said master cylinder comprising a housing having a bore, a pedal-operated piston working in said bore, a pressure space defined in said bore in advance of said piston, a transfer port leading from said pressure space, an inlet port for connection to a pressure source, and means defining a boost chamber to which hydraulic fluid from said pressure source is admitted to act on said piston and augment a force applied to said piston by said pedal when said master cylinder is operated, wherein connections are provided for connecting said pressure spaces to brake on wheels on opposite sides of said vehicle, a transfer passage interconnects said transfer ports, and each master cylinder incorporates a control valve for controlling communication between said pressure space and said transfer passage through said transfer port, each said control valve comprising a valve spool movable between a retracted position to close said transfer port and said inlet port and an operative position in which said transfer port and said inlet port are open, and a spring for urging said spool into said retracted position, said spool having a first pressure-responsive face exposed to said pressure space and, when subjected to pressure in said pressure space in response to operation of said pedal, is operative to urge said spool against the loading of said spring and into said operative position in which said pressure space is placed in communication with said transfer port and said inlet port is placed in communication with said boost chamber.

2. A master cylinder assembly as claimed in claim 1, wherein said spool has a second pressure-responsive face exposed to pressure in said boost chamber to react against pressure from said pressure space and augment the force in said spring, whereby to hold said spool in a balanced position to provide a compensating balanced flow through said transfer passage when both said master cylinders are operated simultaneously.

3. A master cylinder assembly as claimed in claim 2, wherein relative areas of said piston, said presure-responsive faces on said spool, and said face on said piston are so selected that the brake-applying force applied to said piston is augmented by a pressure in said boost chamber which is smaller than the pressure in said pressure space at any given time.

4. A master cylinder assembly as claimed in claim 1, wherein said piston is of differential outline, said piston having a portion of greater area which acts to pressurise fluid in said pressure space, and a portion of smaller area which works through an end closure for said boost chamber, said boost chamber being defined between said end closure and a shoulder on said piston between said portion of greater area and said portion of smaller area.

5. A master cylinder assembly as claimed in claim 4, wherein the piston comprises a one-piece member.

6. A master cylinder assembly as claimed in claim 4, wherein said piston is of two-part construction, and said portion which is exposed to the pressure in said boost chamber is of greater area then said face exposed to pressure in said pressure space.

* * * * *